United States Patent
Bertholdt et al.

Patent Number: 5,958,247
Date of Patent: Sep. 28, 1999

[54] METHOD FOR DISPOSING OF A SOLUTION CONTAINING AN ORGANIC ACID

[75] Inventors: Horst-Otto Bertholdt, Forchheim; Dietmar Bege, Erlangen, both of Germany

[73] Assignee: Siemens Aktiengesellschaft, Munich, Germany

[21] Appl. No.: 08/720,100

[22] Filed: Sep. 30, 1996

Related U.S. Application Data

[63] Continuation of application No. PCT/DE95/00417, Mar. 28, 1995.

[30] Foreign Application Priority Data

Mar. 28, 1994 [DE] Germany .................. 44 10 747

[51] Int. Cl.⁶ ........................................... C02F 9/00
[52] U.S. Cl. ................ 210/668; 210/669; 210/682; 210/688
[58] Field of Search ................... 210/662, 668, 210/669, 684, 688, 748, 759, 760, 805, 167, 195.1, 202, 257.1, 259, 266, 900, 912, 682

[56] References Cited

U.S. PATENT DOCUMENTS

| | | | |
|---|---|---|---|
| 3,276,458 | 10/1966 | Iverson et al. | 210/900 |
| 3,664,870 | 5/1972 | Oberhofer et al. | 210/688 |
| 3,870,033 | 3/1975 | Faylor et al. | 210/900 |
| 4,548,716 | 10/1985 | Boeve | 210/900 |
| 5,073,268 | 12/1991 | Saito et al. | 210/748 |
| 5,126,111 | 6/1992 | Al-Ekabi et al. | 422/186.3 |
| 5,205,999 | 4/1993 | Willis et al. | 423/20 |

FOREIGN PATENT DOCUMENTS

| | | |
|---|---|---|
| 0 527 416 A2 | 2/1993 | European Pat. Off. . |
| 0 540 972 A1 | 5/1993 | European Pat. Off. . |
| 0 543 112 A1 | 5/1993 | European Pat. Off. . |
| 35 01 528 A1 | 7/1986 | Germany . |
| 36 44 080 A1 | 7/1988 | Germany . |
| 39 07 670 C2 | 9/1990 | Germany . |
| 40 00 369 A1 | 7/1991 | Germany . |
| 40 06 243 A1 | 8/1991 | Germany . |
| 40 26 831 A1 | 2/1992 | Germany . |
| 41 11 663 A1 | 10/1992 | Germany . |
| 41 26 971 A1 | 2/1993 | Germany . |
| 41 36 949 A1 | 5/1993 | Germany . |
| 41 37 864 A1 | 5/1993 | Germany . |
| 900 1721 | 7/1990 | Netherlands . |
| 90/00085 | 1/1990 | WIPO . |
| 91/13032 | 9/1991 | WIPO . |
| 92/03829 | 3/1992 | WIPO . |

OTHER PUBLICATIONS

Japanese Patent Abstract No. 050 9997 A, Jan. 31, 1992.

*Primary Examiner*—Ivars Cintins
*Attorney, Agent, or Firm*—Herbert L. Lerner; Laurence A. Greenberg

[57] ABSTRACT

A method and a device are provided for disposing of an aqueous solution that contains an organic acid and an iron complex and occurs particularly in the decontamination of radioactively contaminated surfaces of components. It is contemplated that the iron complex in the solution is reduced by irradiation with UV light. A dissolved iron salt and carbon dioxide, which is given off, are formed in the process. An oxidant is then added to the solution that contains the dissolved iron salt and the organic acid. This produces water, and the iron complex forms once again. Some of the dissolved iron salt is removed from the solution by means of a cation exchanger. The solution containing the iron complex is irradiated again with UV light. A cycle process ensues, which continues until all the organic acid is consumed.

11 Claims, 1 Drawing Sheet

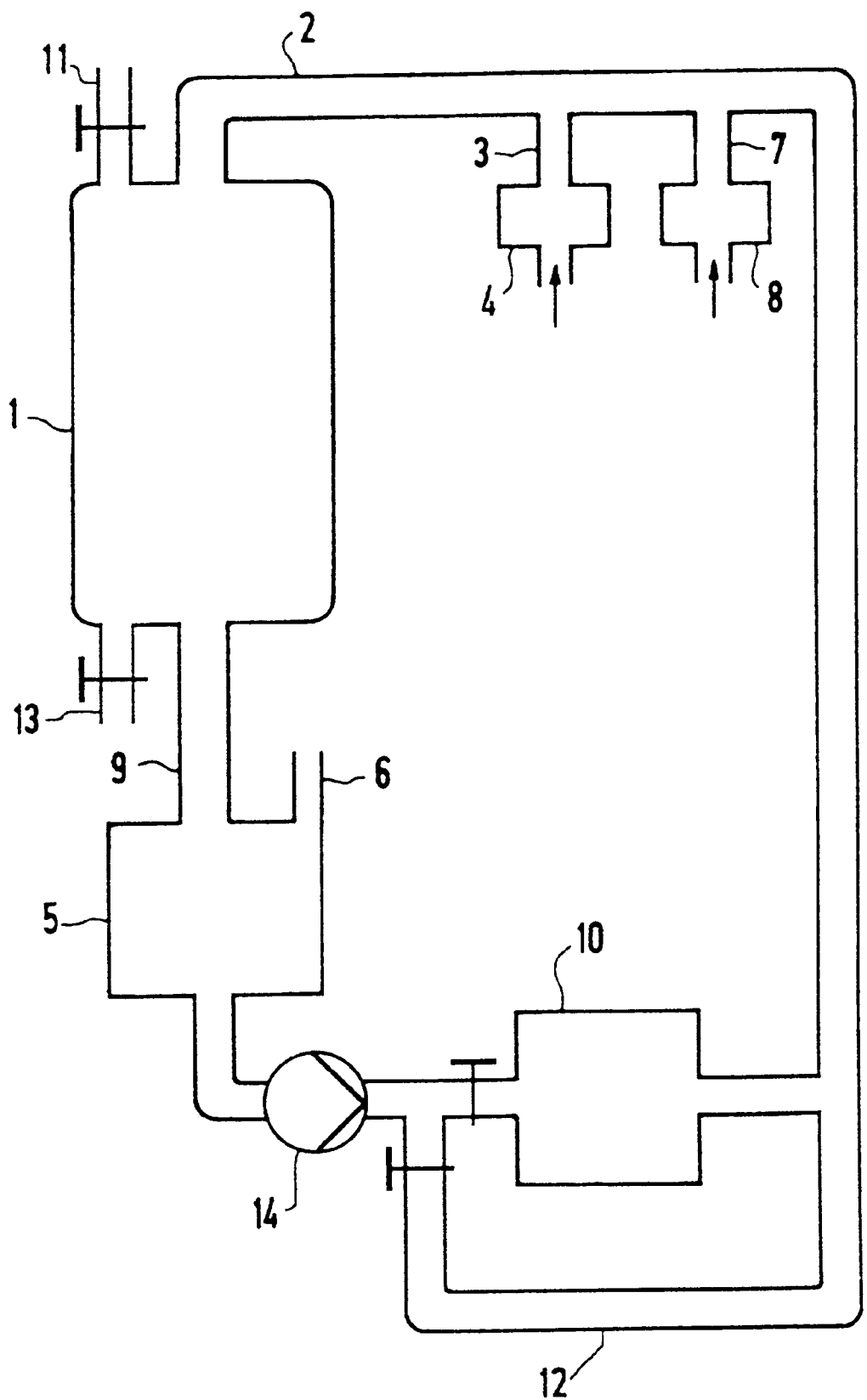

METHOD FOR DISPOSING OF A SOLUTION CONTAINING AN ORGANIC ACID

CROSS-REFERENCE TO RELATED APPLICATION

This application is a Continuation of International Application Serial No. PCT/DE95/00417, filed Mar. 28, 1995.

BACKGROUND OF THE INVENTION

FIELD OF THE INVENTION

The invention relates to a method for disposing of an aqueous solution that contains an organic acid and an iron complex and occurs particularly in the decontamination of radioactively contaminated surfaces of components. The invention also relates to a device for disposing of an aqueous solution, having a container for the solution that contains an organic acid and an iron complex and occurs particularly in the decontamination of radioactively contaminated surfaces of components.

A method and a device for disposing of an organic substance are known from German Patent Disclosure DE 41 26 971 A1. With this method and the associated device, organic acids that have been used in surface decontamination of radioactively contaminated components are treated.

After such decontamination, a solution remains that contains not only the acid portion, which is chemically unchanged, but also chemicals formed in the decontamination as well as radioactive substances removed from the component surface.

In order to make do with the smallest possible final storage vessel, the attempt is made to reduce the volume of the solution before its immobilization.

It is known to feed hydrogen peroxide to the solution while the solution is in contact with a catalyst. The essential products of decomposition are then carbon dioxide and water. The concentration of the solution is reduced as a result, so that after an evaporation step only a relatively small volume remains that has to be immobilized and delivered to a final storage vessel.

The known method and the associated device, to dispose of the organic substance, require a catalyst. Such a catalyst must be put into contact with the substance. To that end, solid catalyst material must be held in suspension in the solution to be disposed of. A variant of this requires a complicated and expensive mounting for the catalyst.

During decontamination, metals in anionic and cationic form occur. For removing these metal ions, it is usual to use anion and cation exchangers. With an anion exchanger, anionic metal complexes and also decontamination chemicals are removed. This requires a large anion exchanger. This produces a large quantity of ion exchange resin that has to be disposed of.

The remaining solution is as a rule concentrated by evaporation, and the resultant concentrate is put in final storage. The decontaminated system is then flushed as well, and the flushing water is evaporated. Accordingly, very large quantities of solution or water must be treated.

SUMMARY OF THE INVENTION

It is accordingly an object of the invention to disclose a method for disposing of an aqueous solution that contains an organic acid, which overcomes the herein mentioned disadvantages of the heretofore-known methods and devices of this general type, and which makes do without the use of a complicated catalyst. Additionally, the invention discloses a suitable device for disposing of such an aqueous solution.

With the foregoing and other objects in view there is provided, in accordance with the invention a method for disposing of an aqueous solution containing an organic acid and an iron complex, the method comprises performing a cycle which includes the steps of irradiating an aqueous solution with UV light for reducing an iron complex to a dissolved iron salt and carbon dioxide; removing a portion of the dissolved iron salt from the aqueous solution with a cation exchanger and leaving a remaining portion of the dissolved iron salt and a remaining portion of an organic acid; adding an oxidant to the aqueous solution containing the remaining portion of the dissolved iron salt and the remaining portion of the organic acid for producing water and more of the iron complex; and repeating the cycle until there is no longer any of the organic acid present.

In accordance with an added mode of the invention, there is the step of admixing ionized iron to the aqueous solution for converting a portion of the organic acid into the iron complex.

In accordance with an additional mode of the invention, there is the step of converting a portion of the organic acid with the ionized iron of a certain valence into the iron complex of the same valence.

In accordance with another mode of the invention, there is the step of converting a portion of the organic acid with ionized trivalent iron into an iron (III) complex.

In accordance with an another mode of the invention, there is the step of forming a dissolved iron salt having a valence less by one than the valence of the iron complex, out of the iron complex.

In accordance with an added mode of the invention, there are the steps of forming a dissolved divalent iron salt having a valence less by one than the valence of the iron (III) complex, from the iron (III) complex in the aqueous solution; removing some of the dissolved divalent iron salt from the aqueous solution with the cation exchanger; and reforming the iron (III) complex from another portion of the dissolved iron salt.

In accordance with an additional mode of the invention, there is the step of selecting an oxidant from a group consisting of hydrogen peroxide and ozone.

In accordance with another mode of the invention, there is the step of selecting a concentration of the oxidant to be between 0.002 mol/l and 0.02 mol/l.

In accordance with an additional mode of the invention, there is the step of selecting a concentration of the oxidant to be between 0.005 mol/l and 0.007 mol/l.

In accordance with an added mode of the invention, there is the step of adjusting the UV light wavelength to be between 250 nm and 350 nm.

In accordance with an concomitant mode of the invention, there is the step of treating an aqueous solution resulting from decontamination of radioactively contaminated surfaces of components.

In particular, after the decontamination process, only a little ion exchange resin and no large quantities of solution that would have to be disposed of should occur.

The first object stated above is attained in accordance with the invention in that the solution is irradiated with UV light, as a result of which the iron complex is reduced and a dissolved iron salt and carbon dioxide are formed; that some of the dissolved iron salt is removed from the solution by means of a cation exchanger; that from another portion of the dissolved iron salt, some of the acid and an added oxidant, water and again the iron complex are formed; and that the remaining solution containing the iron complex and as yet undestroyed organic acid is irradiated again with UV light, the process being continued in a cycle until there is no longer any organic acid present.

The iron complex contained in the aqueous solution to be disposed of has entered this solution for instance in the course of a decontamination. Such a solution can contain chromium complexes and nickel complexes, which instead of an iron complex can contribute to disposing of an aqueous solution that contains an organic acid.

With the method of the invention, the advantage is attained that the organic acid that is present in the solution is converted largely without residue into carbon dioxide and water, without requiring a catalyst. The method for disposing of the organic acid can already be initiated during the decontamination. No expensive equipment is needed. The method can for instance be performed directly in the container that is being decontaminated. The carbon dioxide can be given off, since it is free of radioactive substances.

The re-formed iron complex is advantageously re-used in the method of the invention. This produces a cycle process.

Because of the cycle process, the anionic iron complexes are advantageously converted into iron cations. Only a cation exchanger but no anionic exchanger need therefore be used.

The quantity of the ion exchanger resin to be disposed of advantageously depends only on the actual cation expulsion from the system to be decontaminated. The resin quantity is less by a factor of approximately 20 than the quantity of resin that occurs in known decontamination methods. This applies whenever the method of the invention is used to dispose of a polluted decontamination solution. Because of the small amount of resin, only a small final storage vessel is needed.

With the method of the invention, the solution can advantageously be cleaned sufficiently that it can be re-used, for instance as a coolant, for later operation of the decontaminated system.

The complicated disposal of the solution with an evaporation step is omitted. The decontaminated system also need not be flushed, which would produce large quantities of water that would later have to be evaporated.

The solution to be disposed of as a rule already contains an iron complex. The iron complex is formed to some extent from the organic acid to be disposed of and from iron ions that are already present in the solution to be disposed of. By way of example, these iron ions may have entered the container to be decontaminated during the contamination process, or even before that.

However, if there are no iron ions in the solution, then ionized iron (iron ions) can be admixed with the solution, for instance for converting some of the acid into an iron complex. To that end, an iron salt can for instance be introduced into the solution and ionized there, thereby forming iron ions, among other effects. By the addition of iron ions, the advantage is attained that even if iron ions should be absent from the solution, sufficient iron ions are furnished in order to convert some of the acid into an iron complex.

By way of example, the ionized iron has a certain valence and with some of the acid forms an iron complex, in which the iron has the same valence (iron complex with the same valence).

For example, the ionized iron is trivalent and with some of the organic acid forms an iron (III) complex.

By irradiation with UV light, this complex is converted, forming carbon dioxide, into a dissolved iron salt in which the valence of the iron is for instance less by 1 than the valence of the iron in the complex (iron salt whose valence is less by 1 than the valence of the iron complex). This dissolved iron salt, the remaining acid, and an oxidant which is added form the iron complex over again. Water is also formed.

An iron (III) complex is converted for instance into a dissolved salt of the divalent iron (divalent iron salt). This dissolved divalent iron salt, the remaining organic acid, and an oxidant that is added react chemically and form water and again form the iron (III) complex. This iron (III) complex is equivalent to the iron (III) complex that was previously present. In other words, the iron (III) complex is regenerated.

If not all the remaining organic acid has reacted chemically with the iron salt and the oxidant, for instance because the quantity of iron salt was not sufficient, then carbon dioxide and the requisite dissolved iron salt can be formed again from the regenerated iron complex by irradiation with UV light. The iron salt then reacts with the added oxidant and any still remaining organic acid, thereby re-forming the iron complex and forming water. The result is advantageously a cycle process, which is repeated until all the organic acid has been converted into a relatively slight quantity of iron salt, which is removed with the cation exchanger, and into carbon dioxide and water. The carbon dioxide and water are given off.

A corresponding cycle process is also possible if a different ionized metal is used.

For instance, if the organic acid is oxalic acid, the following reaction equations result:

(1) $3H_2C_2O_4 + Fe^{III} \longrightarrow [Fe^{III}(C_2O_4)_3]^{3-}$
oxalic acid + trivalent iron $\longrightarrow$ iron (III) complex
(2) $[Fe^{III}(C_2O_4)_3]^{3-} + UV \longrightarrow Fe^{II}(C_2O_4)_2 + 2CO_2$
iron (III) complex + UV $\longrightarrow$ divalent iron salt + $CO_2$
(3) $Fe^{II}(C_2O_4)_2 + H_2C_2O_4 + H_2O_2$
divalent iron salt + oxalic acid + hydrogen peroxide
$\longrightarrow [Fe^{III}(C_2O_4)_3]^{3-} + 2H_2O$
$\longrightarrow$ iron (III) complex + $H_2O$ The iron (III) complex formed in reaction equation (3) is re-used in reaction equation (2). The two reaction equations (2) and (3) alternate, until all the oxalic acid has been consumed. Besides $CO_2$ and $H_2O$, then only a slight quantity of the divalent iron salt remains.

A corresponding cycle process is also possible with any other metal complex that can be formed at the beginning by an ionized metal.

No special container is necessary to carry out the cycle process. It can even be performed in the just previously decontaminated container.

The organic acid that is not converted into the divalent iron salt is advantageously converted by the cycle process entirely into water and carbon dioxide, which do not require complicated disposal. The carbon dioxide can be given off.

The oxidant may for instance be hydrogen peroxide or ozone, which are especially well suited.

The concentration of the oxidant is for instance between 0.002 mol/l and 0.02 mol/l, in particular between 0.005 mol/l and 0.007 mol/l. If the hydrogen peroxide concentration were markedly higher, then because of the UV absorption of the hydrogen peroxide, less organic acid would be converted.

An especially suitable wavelength of the UV light used is between 250 nm and 350 nm.

With the foregoing and other objects in view there is also provided, in accordance with the invention, a device for disposing of an aqueous solution containing an organic acid and an iron complex, the device comprising a container for holding an aqueous solution. A loop line having a UV irradiating component connected to and discharging into the container. A supply line connected to the loop line and has a metering device for supplying an oxidant. A cation exchanger connected to the loop line.

In accordance to an added feature of the invention, there is an ion supply line connecting to the loop line and has an ion metering device for supplying a solution containing iron ions.

The second stated object, of disclosing a suitable device for disposing of an aqueous solution, having a container for the solution, which contains an organic acid and an iron complex and occurs particularly in the decontamination of radioactively contaminated surfaces of components, is attained in accordance with the invention in that a loop line begins at the container and discharges into it; that the loop line includes a UV irradiating component; and that a supply line for an oxidant, which includes a metering device, and a cation exchanger are associated with the loop line.

In the UV irradiating component, it is accomplished that an iron complex that is present in the solution is reduced, thus forming a dissolved iron salt and carbon dioxide. The carbon dioxide is given off as a gas via a vent line. With the aid of the metering device, a suitable quantity of the oxidant is then fed in via the supply line. The supply line may communicate with the UV irradiating component via the container or directly, or it may discharge into the loop line at some other point. It is thereby assured that the oxidant will reach the point where the solution that contains the dissolved iron salt and the organic acid is located at that moment.

After the oxidant has been fed in, along with water the iron complex is newly formed. This iron complex is equivalent to the iron complex that was already present previously. This assures that a cycle process can proceed. The iron complex is then re-irradiated with UV light and thereby reduced. Once again, a dissolved iron salt and carbon dioxide form, and from the iron salt along with the remaining acid and the oxidant, the iron complex forms again, along with water. This cycle process can continue until all the acid has been consumed.

A supply line for a solution that contains iron ions can communicate with the container or the loop line via a metering device. Via this supply line, a solution containing iron ions is fed in at the beginning of the method, in the event that iron ions are not already present in the solution located in the container. Usually, however, iron ions are present. If no iron ions were present in the solution, then no iron complex, formed of the iron ions and some of the acid to be disposed of, could be present either.

Since advantageously no interfering anions are present, it is possible with the cation exchanger to clean the remaining solution so extensively that it can be re-used, for instance as coolant. No evaporators are therefore necessary, and consequently no evaporator residues need to be eliminated, either.

A chemical cycle process continues in the loop line until such time as even the portion of organic acid that might possibly remain on one pass is also converted. This is possible because the iron complex is not trapped in the cation exchanger. Once all the acid has been consumed, no further iron complex is formed. A small residue of the iron salt might possibly remain in the solution. The cationic portion of this iron salt, however, is removed from the solution by the cation exchanger. Radioactive cations, which may be present in the solution since a decontamination process, are likewise removed by the cation exchanger. The remaining solution requires no further treatment and can be immediately re-used as coolant.

With the method and the device of the invention, the advantage is attained in particular that in a chemical cycle process, without using expensive catalyst technology, an organic acid can be extensively converted into carbon dioxide and water. Moreover, once decontamination has been performed, neither an anion exchanger nor an evaporator are required to eliminate the residues.

Other features which are considered as characteristic for the invention are set forth in the appended claims.

Although the invention is illustrated and described herein as embodied in a method and device for disposing of a solution containing an organic acid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single figure of the drawing.

BRIEF DESCRIPTION OF THE DRAWING

The FIGURE of the drawing is a circuit diagram of a device for disposing of an aqueous solution that contains an organic acid according to the invention.

DESCRIPTION OF THE PREFERRED EMBODIMENTS

Referring now to the single FIGURE of the drawing in detail, there is shown a container 1, which may be a container to be decontaminated and is a part of a loop line 2. Once decontamination has been done, an organic acid remains in a solution in the container 1 and must be disposed of. The container 1 may, however, also be a separate container into which an aqueous solution that contains the organic acid is placed for disposal. The container 1 has a fill opening 11, through which the solution that is to be disposed of is then introduced. If the decontamination takes place in the container 1, then before the decontamination the decontamination chemicals enter the container 1 through this opening. In the event that the solution that is to be disposed of should not contain any iron complex, an ion supply line 3 is provided for iron ions, which can be introduced in the form of a dissolved iron salt. This ion supply line 3 includes an ion metering device 4 and discharges into the loop line 2. It may also discharge directly into the container 1. By means of the ionized iron, some of the organic acid that is located in the solution is converted into an iron complex.

A UV irradiating component 5 communicates with a first vent line 9 of the container 1, which line is part of the loop line 2. By irradiation with UV light, the iron complex in the solution is reduced there, forming a dissolved iron salt and carbon dioxide.

The carbon dioxide leaves the UV irradiating component 5 via a second vent line 6 communicating with it. Since it contains no contaminated substances, the carbon dioxide can be given off.

Via a supply line 7 for oxidant, oxidant then reaches the loop line 2, in which at that moment the dissolved iron salt and the remainder of the organic acid are located. The metering in of the oxidant is effected by a metering device 8, which is located in the supply line 7. The supply lines 3 and/or 7 may also discharge at some location, not shown, upstream of the UV irradiating component 5 or directly into the UV irradiating component 5. Water and again an iron complex, which corresponds to the previously mentioned iron complex, form from the dissolved iron salt, some of the acid, and the oxidant. From that moment on, a cycle process can be repeated: the iron complex is again reduced by the uv light, forming dissolved iron salt and carbon dioxide. Oxidant thereupon acts again, so that from the oxidant, the iron salt and a further portion of the acid, the iron complex is again formed, along with water. Finally, after a plurality of such cycle processes, all the acid has been converted into carbon dioxide, water and a small quantity of the iron salt.

If the solution to be decontaminated was a decontamination solution, then the remaining solution still contains the radioactive substances removed by the decontamination. These substances and the cationic portion of the ion salt are removed from the solution by the cation exchanger 10, which can be connected downstream of the UV irradiating component 5. No anion exchanger is necessary. Nevertheless, the remaining liquid is so pure that it can be re-used as coolant, for instance in a power plant. The cation exchanger 10 is disposed in the loop line 2. It can be bypassed by a bypass 12, so that some of the solution can bypass the cation exchanger 10 and is as a result not freed of iron salt, as long as iron salt is still needed for forming the iron complex again. As a rule, however, only some of the iron salt is removed from the solution by the cation exchanger 10 in one pass.

No evaporator is necessary for eliminating residual liquid. Advantageously, only very little ion exchanger resin and no evaporator residues occur that would have to be disposed of.

For evacuating the device shown, an evacuation opening 13 is present. A pump 14 may be present in the loop line 2.

We claim:

1. A method for disposing of an aqueous solution containing an organic acid and an iron complex, the method which comprises:

performing a cycle including the steps of:
 irradiating an aqueous solution containing an organic acid and an iron complex with UV light and reducing the iron complex to a dissolved iron salt and carbon dioxide;
 removing a portion of the dissolved iron salt from the aqueous solution with a cation exchanger and leaving a remaining portion of the dissolved iron salt and a remaining portion of an organic acid;
 adding an oxidant to the aqueous solution containing the remaining portion of the dissolved iron salt and the remaining portion of the organic acid for producing water and more of the iron complex; and
repeating the cycle until there is no longer any of the organic acid present.

2. The method according to claim 1, which further comprises the step of admixing ionized iron to the aqueous solution for converting a portion of the organic acid into the iron complex.

3. The method according to claim 2, which further comprises converting the portion of the organic acid with the ionized iron of a certain valence into the iron complex of the same valence.

4. The method according to claim 3, which further comprises converting the portion of the organic acid with ionized trivalent iron into an iron (III) complex.

5. The method according to claim 1, which further comprises forming the dissolved iron salt having a valence less by one than the valence of the iron complex, out of the iron complex.

6. The method according to claim 4, which further comprises:

forming a dissolved divalent iron salt having a valence less by one than the valence of the iron (III) complex, from the iron (III) complex in the aqueous solution;
removing some of the dissolved divalent iron salt from the aqueous solution with the cation exchanger; and
reforming the iron (III) complex from another portion of the dissolved iron salt.

7. The method according to claim 1, wherein the oxidant is selected from the group consisting of hydrogen peroxide and ozone.

8. The method according to claim 1, wherein the concentration of the oxidant is between 0.002 mol/l and 0.02 mol/l.

9. The method according to claim 8, wherein the concentration of the oxidant is between 0.005 mol/l and 0.007 mol/l.

10. The method according to claim 1, which further comprises adjusting the UV light wavelength to be between 250 nm and 350 nm.

11. The method according to claim 1, wherein the step of irradiating comprises: irradiating a radioactively contaminated aqueous solution containing an organic acid and an iron complex.

* * * * *